United States Patent

[11] 3,568,029

| [72] | Inventor | John G. Bollinger<br>Madison, Wis. |
|---|---|---|
| [21] | Appl. No. | 793,859 |
| [22] | Filed | Jan. 24, 1969 |
| [45] | Patented | Mar. 2, 1971 |
| [73] | Assignee | A. O. Smith Corporation<br>Milwaukee, Wis. |

[54] CONSTANT VELOCITY DRIVE CONTROL FOR MACHINE TOOLS AND THE LIKE
7 Claims, 5 Drawing Figs.

[52] U.S. Cl. ..................................... 318/578,
318/632
[51] Int. Cl. ..................................... G05b 19/36
[50] Field of Search ..................................... 318/30,
20.160, 20.530

[56] References Cited
UNITED STATES PATENTS

| 2,415,080 | 2/1947 | Bonell | 318/30 |
| 2,457,532 | 12/1948 | Cunningham | 318/(20.530) |
| 2,962,645 | 11/1960 | Rudolf, Jr. et al. | 318/(20.160X) |
| 3,300,696 | 1/1967 | Fillmore et al. | 318/(20.160) |

Primary Examiner—T. E. Lynch
Attorney—Andrus, Sceales, Starke & Sawall

ABSTRACT: This disclosure includes a pair of drive motors energized to move a weld head along two related perpendicular axes in a horizontal plane. The one motor is a variable speed motor. A closed servoloop includes a reference input to establish a constant velocity drive along the related axis for the variable speed motor. A separate cam and follower positions a potentiometer to generate a signal proportional to the velocity correction at each point on the path for lateral movement with respect to the one axis. The signal is combined with the reference input in the servo to establish a modified drive signal. This maintains the resultant horizontal velocity vector constant.

PATENTED MAR 2 1971 3,568,029
SHEET 1 OF 2
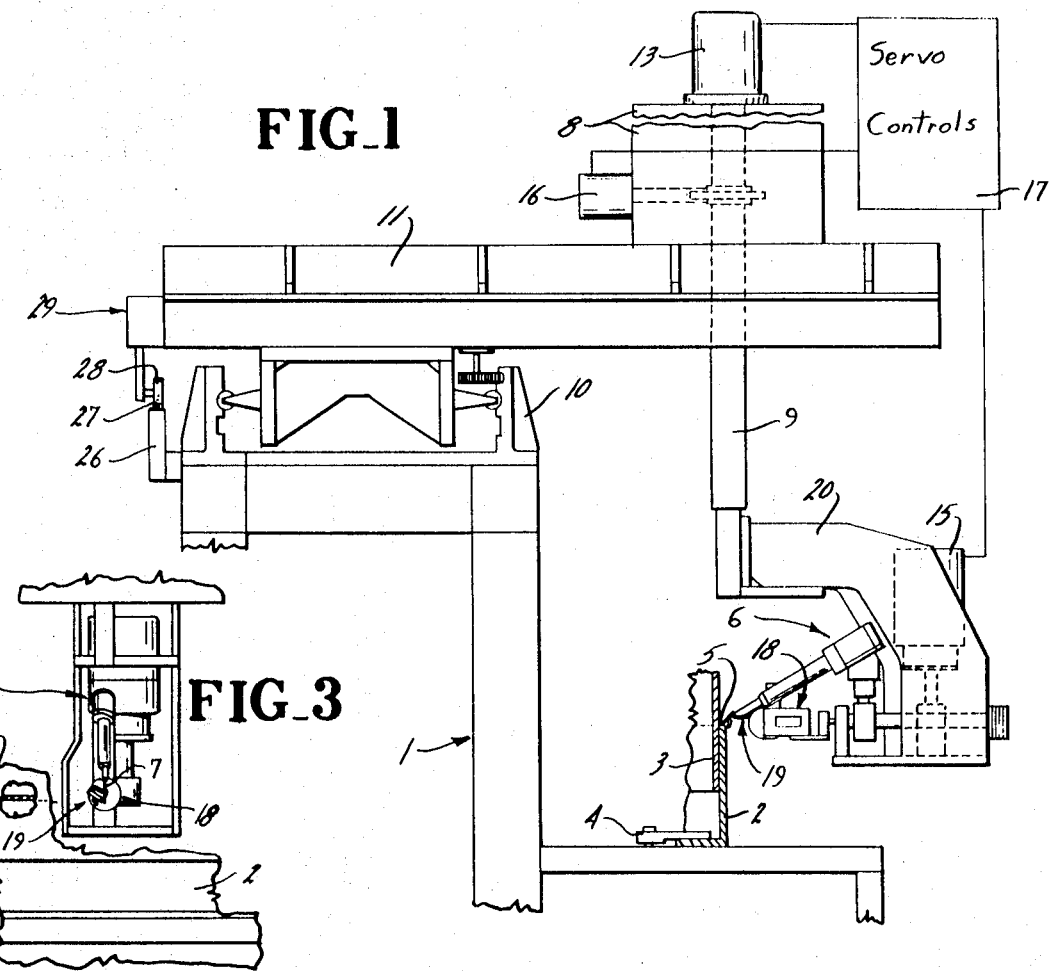
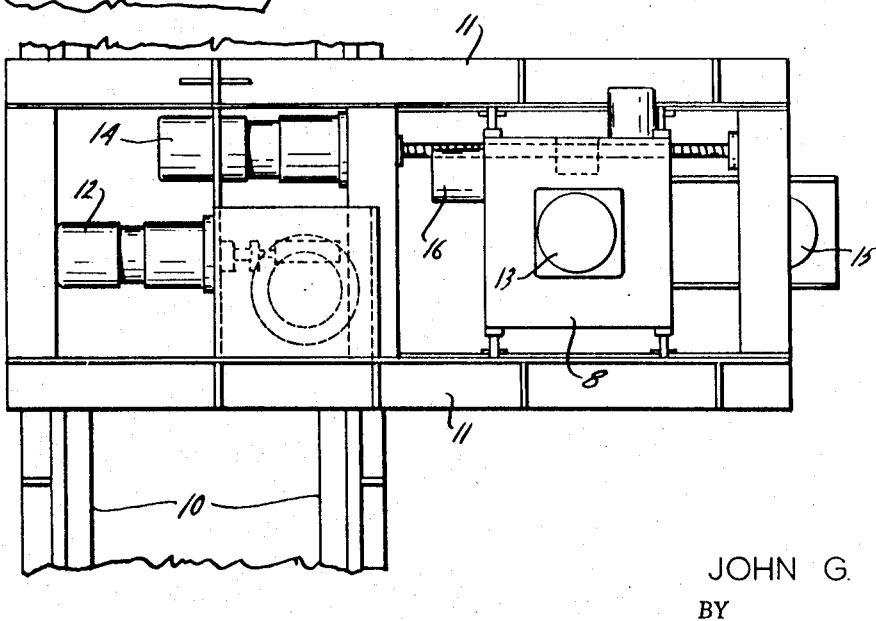
INVENTOR.
JOHN G. BOLLINGER
BY
Andrus, Sceales, Starke & Sawall
Attorneys

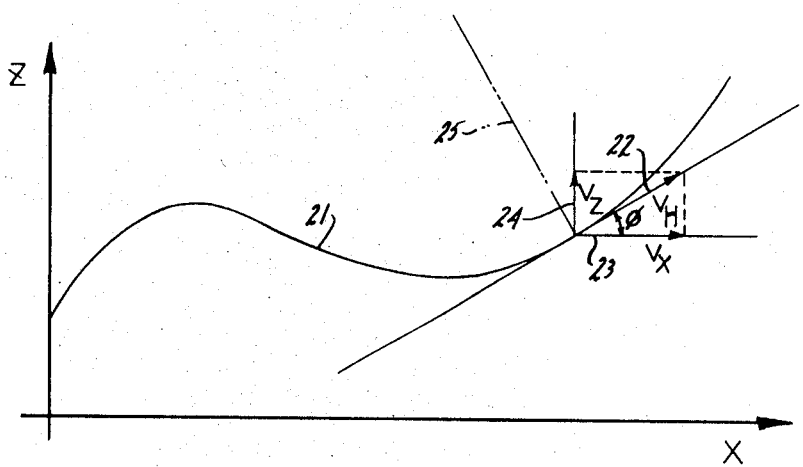
FIG_4
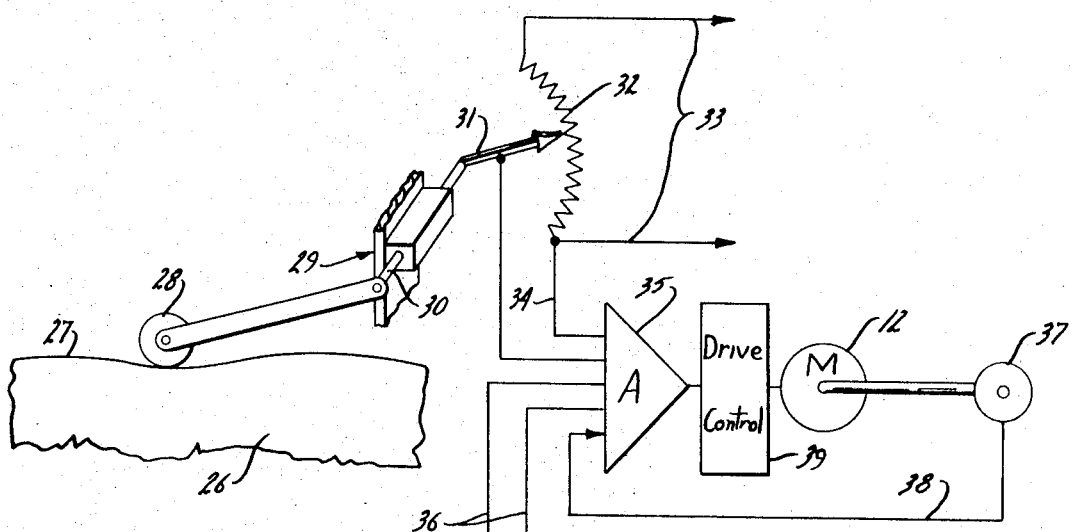
FIG_5
Reference Input
INVENTOR.
JOHN G. BOLLINGER

CONSTANT VELOCITY DRIVE CONTROL FOR MACHINE TOOLS AND THE LIKE

This invention relates to a constant velocity drive control for properly positioning of a tool or the like along a predetermined path.

In welding and the like, automatic apparatus may be provided with a drive means causing the electrode to follow a contoured weld seam which may move in any one of a plurality of directions. Various systems have been suggested for controlling the movement of a weld electrode in accordance with the changing contour of a weld seam. The copending application of John G. Bollinger entitled "Automatic Tracer for Positioning Control" which was filed on the same date as the present application and is assigned to the same assignee discloses a reliable 5-axis seam tracker. In accordance with the teaching of that application, the welding head assembly is mounted to position the electrode in five different coordinates or directions, including the three major Cartesian axes and two angular axes within the two principle planes; the vertical plane and the horizontal plane. The weld head is driven in a reference direction corresponding to the longitudinal direction of the weld and related to the X-axis. The above application is particularly directed to a probe sensor which follows the weld seam and produces electrical signals or the like for positioning the electrode in the Y-axis and Z-axis directions. The X-axis drive is preferably controlled to maintain a constant horizontal velocity such that the weld metal is correspondingly deposited at a constant rate per unit of weld seam traversed regardless of the movement in the horizontal plane. A means which was developed to maintain the constant velocity is disclosed in the thesis reports filed in the University of Wisconsin Library in Madison, Wisconsin are referred to in the previously identified copending application. In that system the velocity vectors in the X and Z direction were sensed by suitable tachometers and the signal passed through sine and cosine potentiometers. The outputs were inserts in a controlling servo system for the angular orientation of the electrode. Additionally, the angular control signals were employed to control the velocity of the X-axis drive. However, instability arose in the system which upon subsequent analysis was found to be related to the interaction between an angular error introducing an error in the velocity signal component. Thus, an adverse interaction existed between changes in the angle orientation in the X–Z plane and the X-axis drive, resulting in oscillations about the desired valve of drive in the X-direction. Furthermore, the spurious variations in the X-axis drive resulted in variations in the Z-axis drive.

The present invention is directed to controlling a variable velocity drive in one coordinate direction while maintaining the other modes of orientation by decoupling and separately establishing of the control signals for the angular orientation and maintaining a desired constant velocity vector relationship. Generally, in accordance with the present invention, a separate means is provided for generating a signal proportional to the velocity correction at each point on the workpiece with the changing angle and this signal is inserted and combined in the speed servo signal comparator to establish a modified drive signal. Thus, the velocity correction signal may be superimposed upon a reference signal to establish a modified reference signal which is compared with a feedback signal indicative of the actual velocity in the given direction to produce the modified drive signal which through the servosystem controls the drive in the given direction. This has been found to provide a very reliable and accurate means of maintaining the resultant horizontal velocity vector constant while also maintaining the sensitive and reliable angular or other positioning of the controlled member. In a particular novel aspect of the present invention, the weld seam in the given plane is drawn and by vector analysis a curve is drawn corresponding to the drive velocity correction in the given direction to maintain a constant resultant horizontal velocity for changes from the reference axis. The height of the curve which is proportional to the velocity correction in the given direction is employed to form a cam profile. As a result, the cam profile is a trace corresponding to the velocity correction or modification required to maintain a constant resultant horizontal velocity. The cam is mounted as a part of the tracer apparatus with a cam follower moved with the weld head and coupled to actuate a potentiometer or other signal generating means to establish a corresponding output voltage. This voltage is superimposed upon the reference voltage in the servo system. As a result, the servosystem drives the weld head in the reference direction at a variable speed to maintain the velocity of movement in the horizontal plane constant.

The concept of employing a cam to separately generate a modifying signal superimposed upon the reference signal provides a means of accurately positioning the welding head and electrode or other operating apparatus, although any other means which is not connected so as to interact with the other coordinate controls may be employed.

The drawings furnished herewith illustrate the best mode presently contemplated by the inventor for carrying out the subject invention and clearly disclose the above advantages and features as well as others which will be readily understood from the following description of the drawings.

In the drawings:

FIG. 1 is an elevational view of a welding assembly constructed in accordance with the present invention;

FIG. 2 is a top elevational view of the assembly shown in FIGS. 1 and 2;

FIG. 3 is a partial side elevational view of the assembly shown in FIG. 1;

FIG. 4 is a diagrammatic illustration of a weld seam in the X–Z plane with velocity vectors superimposed thereon for purposes of describing the present invention; and FIG. 5 is a schematic diagram of a servocontrol system incorporating the subject matter of the present invention.

Referring to the drawings and particularly to FIGS. 1 through 3 inclusive, the present invention is illustrated in connection with an automatic arc welding apparatus including a supporting frame structure 1 within which a pair of overlapping metal plates 2 and 3 are disposed and secured in fixed relationship by a clamp structure 4. The overlapping metal plates 2 and 3 are clamped in a vertical position to define a weld lap joint seam 5 at the position of overlap which is to be provided with a continuous interconnecting weld 5a. In the illustrated embodiment of the invention, an arc welding head 6 is movably supported within the supporting frame structure 1 to follow the weld seam 5 and to direct a weld electrode 7 through the same and by applying a welding potential between the electrode 7 and the plates 2 and 3 establishing a welding arc which continuously deposits electrode metal onto the seam 5. In the illustrated embodiment of the invention, the weld head 6 and in particular the tip of the weld electrode 7 may be positioned along the three coordinate axis of the Cartesian coordinate system as well as angularly oriented about two of the axes. Generally, the supporting structure includes a vertical column 8 within which a vertical positioning screw 9 is mounted. The weld head 6 is interconnected to the lower end of the vertical shaft 9 which defines the Y-way support for the weld head apparatus. The column 8 in addition is mounted to the support structure 1 by an X-way support 10 to allow movement of the total assembly in the direction of the weld seam 5. The overlapping plates 2 and 3 are secured within the structure with the seam 5 extending generally in a horizontal plane which is hereinafter defined and relates to the X-coordinate axis or direction of the Cartesian coordinate system.

The column 8 is driven along the X-way by an X-axis drive motor 12, as shown in FIG. 2. The Y-axis drive motor 13 is mounted to the top of the column 8 and coupled to the vertical shaft 9 for positioning the weld head 6 in the Y-direction. A Z-axis drive motor 14 is provided for moving of the column 8 in the Z-axis direction.

A theta axis drive motor 15 is coupled to head 6 and controls the positioning of the head 6 and associated electrode 7 in the X-Y or vertical plane to maintain predetermined angular orientation in that plane. Similarly, a phi axis drive motor 16 angularly orients or positions the head 6 and associated electrode 7 in the X-Z or horizontal plane for correspondingly maintaining of the optimum introduction of the electrode 7 into the seam 5. The motor 16 is mounted within the supporting column 8 and is coupled to a suitable gear drive mechanism to angularly position the supporting shaft 9 and thereby properly position the electrode in the X-Z plane in the illustrated embodiment of the invention.

Generally, each of the motors is controlled by a separate servo control unit 17, shown in single block diagram in FIG. 1, for purposes of simplicity and clarity of explanation. Such systems are well known in the art and consequently the detailed description thereof is not given.

The illustrated embodiment of the invention includes a 5-axis automatic seam tracker wherein the X-axis drive motor 12 is in a velocity feedback control loop and is driven at a reference speed and the other four axes are under closed loop position control. The X-axis constitutes the main horizontal extension of the weld. The Y-axis and Z-axis provide the two perpendicular coordinate movements and the theta and phi angular controls provide for the desired angular orientation about the Y-axis and X-axis, respectively. The theta axis provides rotation about the horizontal axis perpendicular to the tangent at the weld point and more fully described in the previously referred to copending application. The phi axis drive motor provides rotation about Y-axis and in particular maintains the desired angle between the X-axis reference drive and the horizontal projection of the tangent to the weld point.

In the illustrated embodiment of the invention, a transducer 18 is coupled to the weld head 6 and includes a probe tip 19 riding in the seam to control the movement along the Y-axis and the Z-axis. The structure is preferably in accordance with the previously referred to copending application and includes an L-shaped mounting frame 20 which is secured to the lower end of the shaft 9. The L-shaped mounting frame 20 extends laterally outwardly from the work with a depending leg extending downwardly and terminating in a supporting base or plate 20a. The transducer 18 and the arc welding head 6 are suitably secured to the mounting plate 22.

The present invention is directed to the actuation and energization of the X-axis drive motor 12 and particularly to the establishment of a modifying voltage signal which is combined with a reference signal in a servosystem, such as shown in FIG. 5, to vary the drive in the X-direction in a manner to establish a constant velocity of the electrode in the horizontal plane. Thus, referring particularly to FIG. 4, the projection of a weld line or seam is shown by a typical trace 21. The horizontal velocity component is pictorially shown at 22 for a given point of the weld seam 5. The velocity component 22 is tangent to the work line or seam trace 21 at a given point. The horizontal velocity component 22 can be resolved into the X-velocity component 23 and a related Z-velocity component 24. The electrode 7 is preferably positioned by an angle phi to maintain the electrode line 25 normal to the weld line. For optimum welding control, the angle is maintained normal to the tangent line; that is, at an angle corresponding to the slope of the seam 5 with X-axis as a reference. This angle, with a seam as shown in FIG. 4, is continuously changing. Consequently, applicant has found that to employ the sine-cosine potentiometer concept attached to the phi axis servo where all motions are interrelated results in instability because the slightest error in the angle position results in a corresponding error in the velocity control component. This can then cause the velocity component to continuously vary about its correct value with a corresponding change in the velocity in the X-direction.

The present invention separates the X-velocity component control system by providing a modifying signal to the X-velocity drive which is related to the magnitude of the angle and the change in the angle, but which is independently generated.

In the illustrated embodiment of the invention, a separate control cam 26 secured to support 1. Cam 26 is a platelike member extending generally parallel to the seam 5 and having a profile or edge 27 corresponding to an X-velocity correction factor at each point on the seam 5 and related to the angle and to the change in the angle. A cam follower 28 rides on the edge of the cam 26 and is provided with an outer pivotal mounting 29 and coupled to an output shaft 30; providing a rotary output proportional to the X-velocity correction factor, as follows:

The cam 26 and particularly profile 27 may be manually formed by laying out the horizontal projection of seam 5; for example, as shown in FIG. 4. The velocity vectors at each point are manually determined by the change in the angle phi versus the position of the X-axis plotted. Based on this graphical representation, the X-velocity correction error to maintain the horizontal velocity constant for all angles can be determined and correspondingly plotted versus the X-axis position and thereby define the profile of the cam 26. Thus, the height of such a curve is proportional to the velocity correction in the X-direction to maintain the horizontal velocity constant. The cam profile 27 can therefore be readily formed and mounted as a fixed part of the apparatus with the cam follower 28 mounted to move with the weld head assembly along the X-axis such that the position of the cam follower 28 with respect to the profile 27 of the cam corresponds precisely to the location of the electrode 7 with respect to the actual seam 5.

The cam follower 28 pivots about its mounting 29 and produces an angular orientation of the rotary output or coupling shaft 30. In the illustrated embodiment of the invention, a potentiometer contact arm 31 is connected to the shaft 30 and correspondingly positioned with respect to a potentiometer 32. A reference voltage source 33 is connected across potentiometer 32 such that the voltage at the contact 31 with respect to the lower end of the potentiometer 32 in FIG. 5 corresponds to the correct angle phi. A pair of error signal leads 34 are connected respectively to the contact 31 and the lower end of the potentiometer 32 and interconnected as an input to a summing error amplifier 35 to a servoloop for controlling the X-axis drive motor 12. The illustrated servoloop is a closed loop velocity system having a reference voltage input 36 providing a voltage signal corresponding to a straight line movement in the X-direction. In addition, a tachometer 37 is coupled to the drive motor 12 and interconnected through a feedback line 38 to the amplifier 35 to establish an input voltage signal related to the actual velocity in the X-direction. The output of the summing amplifier 35 is interconnected to energize a motor drive unit or means 39 which in turn controls the actual energization and speed of the motor 12 and therefore the speed or the velocity of the weld head 6 and in particular electrode 7 in the X-direction.

For example, assuming that the weld seam 5 includes a straight line portion in the direction of the X-axis and that the weld head 6 is traversing that portion of the seam the output cam 26 positions the cam follower 28 to hold the potentiometer contact 31 to the zero end of the potentiometer 32. Consequently, no error signal appears at the input leads 34. The output of the summing error amplifier 35 is therefore solely controlled by the comparison between the reference voltage input 36 and the feedback line 38. The X-axis drive motor 12 will then be energized to maintain the speed at a level whereat the output of the tachometer 37 balances the reference voltage input and thereby maintains the desired velocity along the straight line.

If the weld seam 5 varies in the horizontal plane, the profile 27 of the cam 26 will vary in a corresponding related manner and in particular will reposition the cam follower 28 and therefore the potentiometer contact 31 to establish a velocity correction voltage at the leads 34. The motor will now be energized such that the output of the tachometer 37, appearing at the line 19, will balance the modified reference input voltage. Therefore, the servo will provide a constant resultant horizontal velocity of the electrode 7 along the weld seam 5.

Applicant has found that the individual and completely separate control loop provides a highly reliable and accurate tracking of the weld seam 5 and in particular maintains the desired constant resultant velocity of the electrode movement without interfering with accurate positioning along the other coordinates.

I claim:

1. In a tracer control for moving a member in two perpendicular directions in a given plane to define a preselected path, comprising a sensing means connected to directly sense the desired position of said member in only a first of said perpendicular directions and establishing a variable control signal, a first variable drive means connected to move the member in said first direction in direct proportion to said variable signal, a second variable drive means for moving said member in a second of said perpendicular directions, a reference input means connected to said second variable drive means for establishing movement in the second direction at a selected reference velocity corresponding to a desired velocity in said plane, a correction means establishing a correction signal solely proportional to the velocity correction in the second direction associated with the movement in said first direction necessary to maintain the resultant movement of the member constant in the given plane and connected with the reference input signal to said second variable drive means to conjointly actuate said second variable drive means and vary the velocity in the second direction from said reference velocity to maintain the desired constant velocity in said given plane.

2. The tracer control of claim 1 having feedback means to sense the actual velocity, said second variable drive means having a second input means connected to said feedback means to actuate the second variable drive means to maintain and stabilize the selected constant resultant velocity in the given plane.

3. The tracer control of claim 1 wherein said second variable drive means includes a servo summing amplifier, said reference input means and said correction means being connected to the summing amplifier.

4. The tracer control of claim 1 wherein said correction means includes a control cam and follower positioned relative to each other in accordance with the relative position of the member along said path and a signal generator coupled to said follower to produce said correction signal.

5. The tracer control of claim 1 for moving a weld electrode having means for angular orientation in a vertical plane and a horizontal plane defining said given plane, comprising means to sense the velocity of the electrode in the two perpendicular directions in said given planes for angularly orienting the electrode in said given plane, said variable drive means including a motor coupled to the weld electrode for moving said electrode in the second direction and having a multiple input summing amplifier connected to the reference input means and to the correction means, and said correction means including a cam actuated signal generator having an input responsive to the positioning of the electrode in said first direction and an output proportional to the velocity correction.

6. The tracer control of claim 1 for moving a welding electrode means with a horizontal plane as said given plane and said path being defined by a X-coordinate and a Z-coordinate axis in said plane, wherein said first sensing means senses to position the member on the Z-coordinate axis, said variable drive means having a motor coupled to said member and having a closed loop servosystem for said motor, a first voltage signal means defining said reference input means and connected as a first input to the servosystem, a cam means and a follower coupled to said electrode means to establish said signal proportional to the velocity correction as a correction voltage and connected as a second input to said servosystem, a signal generator coupled to said motor and connected to said servosystem.

7. The tracer control of claim 1 wherein said first reference input means establishes a voltage signal having an amplitude proportional to the desired reference velocity, and said correction means establishes a corresponding correction voltage signal, and said second variable drive means having a summing means connected to summate said voltage signals and establish a drive proportional to the difference in said voltage signals.